(12) United States Patent
Harrison et al.

(10) Patent No.: US 8,412,291 B2
(45) Date of Patent: Apr. 2, 2013

(54) DETECTION, SELECTION AND PROVISION OF EXTERNAL ANTENNAS FOR A MOBILE DEVICE

(75) Inventors: Joshua Harrison, Kirkland, WA (US); David Deckert, Woodinville, WA (US)

(73) Assignee: Microsoft Corporation, Redmond, WA (US)

(*) Notice: Subject to any disclaimer, the term of this patent is extended or adjusted under 35 U.S.C. 154(b) by 276 days.

(21) Appl. No.: 12/783,425

(22) Filed: May 19, 2010

(65) Prior Publication Data

US 2011/0287820 A1 Nov. 24, 2011

(51) Int. Cl.
*H04M 1/00* (2006.01)
(52) U.S. Cl. ............... 455/575.7; 455/550.1; 455/552.1; 455/553.1; 455/557; 455/575.1; 455/569.2; 343/702; 343/876
(58) Field of Classification Search ................. 455/90.3, 455/553.1, 556.1, 557, 569.2, 575.1, 575.7, 455/550.1; 343/702, 876
See application file for complete search history.

(56) References Cited

U.S. PATENT DOCUMENTS

| | | | |
|---|---|---|---|
| 5,754,962 A * | 5/1998 | Griffin | 455/569.2 |
| 5,898,908 A * | 4/1999 | Griffin et al. | 455/127.2 |
| 6,212,415 B1 | 4/2001 | Demuro et al. | |
| 6,853,197 B1 * | 2/2005 | McFarland et al. | 324/549 |
| 7,023,389 B2 | 4/2006 | Demicco et al. | |
| 7,251,499 B2 | 7/2007 | Ellä et al. | |
| 7,511,681 B2 * | 3/2009 | Bolin | 343/876 |
| 2004/0229648 A1 * | 11/2004 | Yamamoto et al. | 455/557 |
| 2006/0234781 A1 * | 10/2006 | Bosch | 455/569.2 |
| 2008/0039160 A1 | 2/2008 | Homer et al. | |
| 2008/0287064 A1 | 11/2008 | Weiss | |
| 2009/0004977 A1 | 1/2009 | Piovaccari et al. | |
| 2009/0109117 A1 | 4/2009 | Johansson et al. | |

OTHER PUBLICATIONS

Farson, "Automatic Antenna Tuners & Couplers," http://www.ab4oj.com/atu/main.html, downloaded Apr. 17, 2010.

* cited by examiner

*Primary Examiner* — Olumide T Ajibade Akonai
(74) *Attorney, Agent, or Firm* — Klarquist Sparkman, LLP

(57) ABSTRACT

A mobile device can detect, select and use an external antenna supported by an attached accessory device. The mobile device queries the accessory device whether it supports an external antenna and receives an indication of whether the accessory device supports external antennas. The indication can comprise a list of accessory device pins operatively coupled to supported external antennas. The mobile device selects an external antenna for use by the mobile device. The selection can comprise selecting a mobile device pin operatively coupled to the selected external antenna. The selected mobile device pin can be a predetermined pin or a pin that is both operatively coupled to a supported external antenna and configured to operate as an external antenna pin. The mobile device can use the selected external antenna. The mobile device can switch between an internal antenna and an external antenna operatively coupled to a selected mobile device pin.

18 Claims, 10 Drawing Sheets

DETECTION, SELECTION AND PROVISION OF EXTERNAL ANTENNAS FOR A MOBILE DEVICE

FIELD

The present disclosure relates to the detection, selection and provision of external antennas for use by mobile devices.

BACKGROUND

Modern mobile devices are configured for communication with various external transmitters, receivers and transceivers to enable a variety of wireless functions. For example, mobile phones are capable of hosting mobile phone calls, wirelessly accessing the Internet and playing programs broadcast by AM/FM radio stations. Antennas housed within these mobile devices are used to transmit and receive electromagnetic signals to/from the various transmitters, receivers and transceivers through the modulation of various properties (e.g., amplitude, frequency, pulse width, phase) of electromagnetic waves. These antennas are connected to receivers, transmitters or transceivers that are part of the mobile device.

Generally, transmission and reception capabilities of an antenna scale with antenna size. However, the size of conventional mobile devices, particularly that of handheld mobile devices, restricts antenna size and placement. For example, not only can the small form factor of handheld mobile devices restrict the physical size of the antenna, but interference between the antenna and other mobile device components can influence antenna design as well. Some mobile devices have antennas that are extendable or that protrude from the mobile device housing in an attempt to improve antenna performance, but these features may not be desirable as some consumers prefer aesthetically pleasing mobile devices having clean lines and a sleek look.

Some conventional mobile devices utilize antennas included in an attached accessory device to improve signal reception. For example, some conventional mobile media players use the wires extending from the mobile device to earbuds of a connected headphone set as an antenna source. However, the headphone adapter or jack of a mobile device can be arranged along the same edge of the mobile device as a dock connector. Thus, when such a mobile device is connected to a dock, the device cannot take advantage of a headphone antenna. Even if a headphone adapter is arranged on the mobile device such that a headphone can be connected to the mobile device when the mobile device is connected to a dock, a headphone set may not be readily available.

Accordingly, it is desirable to provide mobile device accessory devices that can provide an antenna for use by an attached mobile device. It is further desirable to provide mobile devices that can detect, select and use antennas supported by mobile phone accessories.

SUMMARY

A mobile device is disclosed that can detect, select and use an external antenna for the improved reception of electromagnetic signals. Methods of detecting, selecting and providing the external antennas are also disclosed.

In one embodiment, a mobile device can query an attached accessory device whether it supports an external antenna. The accessory device can indicate to the mobile device that it supports an external antenna and the mobile device can select an external antenna for use by the mobile device. The selection can comprise selecting a mobile device pin operatively coupled to the selected external antenna as an active external antenna pin. The selected mobile device pin can be a predetermined or default mobile device pin. The mobile device can use the selected external antenna as an antenna for the mobile device.

In another embodiment, the accessory device can indicate which accessory device pins are operatively coupled to the external antennas supported by the accessory device. The accessory can optionally provide additional information about the supported external antennas such as which particular frequencies or frequency band each antenna is tuned to. The mobile device can select one of the mobile device pins that is operatively coupled to one of the external antennas and configured to operate as an external antenna pin, as an active external antenna pin.

In yet another embodiment, the mobile device can comprise a first internal antenna connected to an AM/FM receiver. The AM/FM receiver can be configured for receive-only communication with AM/FM radio signal transmitters. The mobile device can use the internal antenna as an antenna source for the receiver. Upon detecting connection to an accessory device, the mobile device can query the accessory device whether it supports external antennas, receive an indication that the accessory device supports one or more external antennas, select an external antenna, and switch from the internal antenna to the selected external antenna as the AM/FM receiver antenna source. The mobile device can switch back to using the internal antenna as the antenna source upon detecting separation from the accessory device. The mobile device can further comprise a second internal antenna connected to a transceiver configured for two-way communication.

In still another embodiment, the mobile device can be connected to multiple accessory devices and select one or more external antennas supported by the multiple devices. The mobile device can simultaneously use multiple external antennas supported by one or more connected accessory devices.

The foregoing and other objects, features and advantages of the invention will become more apparent from the following detailed description, which proceeds with reference to the accompanying figures.

DETAILED DESCRIPTION

As used in this application and in the claims, the singular forms "a," "an," and "the" include the plural forms unless the context clearly dictates otherwise. Similarly, the word "or" is intended to include "and" unless the context clearly indicates otherwise. The term "comprising" means "including;" hence, "comprising A or B" means including A or B, as well as A and B together. Additionally, the term "includes" means "comprises."

Although the operations of some of the disclosed methods are described in a particular, sequential order for convenient presentation, it should be understood that this manner of description encompasses rearrangement, unless a particular ordering is required by specific language set forth below. For example, operations described sequentially can in some cases be rearranged or performed concurrently. Moreover, for the sake of simplicity, the attached figures cannot show the various ways in which the disclosed systems, methods and apparatuses can be used in conjunction with other systems, methods and apparatuses. Additionally, the description sometimes uses terms like "produce" and "provide" to describe the disclosed methods. These terms are high-level abstractions of the actual computer operations that are performed. The actual computer operations that correspond to these terms will vary depending on the particular implementation and are readily discernible by one of ordinary skill in the art. Further, any of the methods disclosed herein, in part or in whole, can be performed automatically without user intervention by the disclosed devices.

Figure 1:
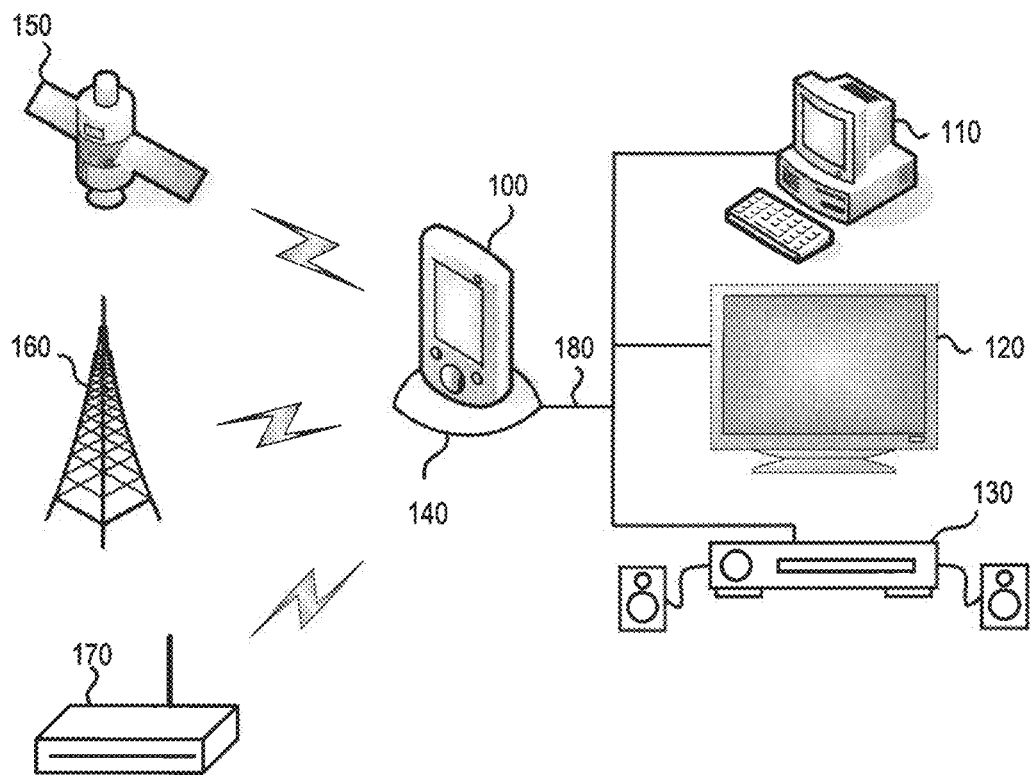
FIG. 1 shows an exemplary mobile device in wireless communication with various transmitters and connected to various accessory devices.

Turning now to the drawings, FIG. 1 shows an exemplary mobile device 100 in communication with various transmitters and connected to one or more of a personal computer 110, television 120 or stereo system 130 via a docking station 140. The mobile device 100 can communicate with any type of transmitter, such as satellite 150, terrestrial tower 160 or wireless router 170. For example, the mobile device 100 can communicate with a GPS (global positioning system) satellite, a low earth orbit satellite that is part of a telecommunications network, an AM or FM radio broadcast tower, a cellular network base station or a wireless WLAN (wireless local area network) router 170.

The term "transmitter" as used herein refers to devices and apparatuses that are capable of transmitting and/or receiving signals through the modulation of electromagnetic waves. Thus, unless otherwise indicated, the term transmitter includes receivers (devices capable of receiving but not transmitting electromagnetic signals) and transceivers (device capable of both transmitting and receiving electromagnetic signals) in addition to devices that are capable of transmitting but not receiving electromagnetic signals.

The mobile device 100 can communicate with various types of transmitters to perform a wide variety of functions such as playing programs broadcast by an AM or FM radio station on a speaker system, downloading video for output at a television or personal computer, hosting a mobile phone call, wirelessly accessing the Internet or the mobile device user determining his or her location. For a given communication link between the mobile device 100 and a transmitter, the communication can comprise either one-way or two-way communication. In one-way, or simplex, communication, the mobile device 100 or a component thereof is configured either for receive-only communication, wherein the device can receive but not transmit signals from/to a transmitter; or transmit-only communication, wherein the device can transmit but not receive signals to/from a transmitter. For example, a mobile device 100 can be configured for receive-only communication with an AM/FM broadcast tower or a GPS satellite. That is, the mobile device 100 is not configured to transmit signals back to the radio tower or the satellite. The mobile device 100 can also be configured for two-way, or duplex, communication with a cellular network base station or a wireless router. That is, the mobile device 100 is configured to both receive and transmit signals from/to the base station or the wireless router. As will be described in greater detail below, the mobile device 100 uses one or more antennas internal to the mobile device 100 and/or external antennas available for use by the mobile device 100 to communicate with the transmitters 150, 160, 170.

The transmitters 150, 160, 170 are capable of broadcasting a wide variety of electromagnetic signals. Generally, the transmitters are capable of transmitting signals in the radio frequency band (from about 3 kHz to about 300 GHz) such as AM (amplitude modulation), FM (frequency modulation), DARS (digital audio radio service), DBS (direct broadcast satellite), DMB (digital multimedia broadcasting), DTR (digital television radio), DAB (digital audio broadcasting), UHF (ultra high frequency), VHF (very high frequency) and/or GPS (global positioning system) signals. In some embodiments, the transmitters 150, 160, 170 are capable of both transmitting and receiving radio frequency signals such as cellular network communication signals such as GSM (global system for mobile communication) and CDMA (code division multiple access) signals. The transmitters 150, 160, 170 can broadcast and/or receive signals at frequencies outside the radio frequency band as well.

The internal and external antennas used by the mobile device 100 to communicate with the transmitters can be tuned to one or more specific frequencies or frequency bands. The specific frequencies or frequency bands for each antenna can be determined by the intended use of each antenna. For example, an antenna designed for use as an FM antenna can be tuned to a frequency band associated with FM radio, whereas an antenna designed for use as a cellular communications network antenna can be tuned to a different frequency band. The antenna tuned for use as an FM antenna can have resonance properties within the FM frequency band that are better than its resonance properties in the cellular communication band. Similarly, the antenna tuned for use as a cellular network communication antenna can posses better resonance properties within the cellular network band that are better that its resonance properties in the FM band.

Generally, the mobile device 100 can be any electronic device. For example, the mobile device 100 can be a portable device such as a PDA (personal digital assistant), mobile phone, smart phone, two-way radio, media player, GPS navigation system or laptop or netbook computer. The mobile device 100 can also be a non-portable device such as a desktop computer or a workstation.

An accessory device or accessory as described herein can be any device capable of physically connecting to and being electronically coupled with a mobile device and that comprises or is attached to an antenna or is connected to another electronic device that comprises or is attached to an antenna. For example, an accessory device can be a personal computer 110, television 120, stereo system 130, docking station 140 or any mobile device as described herein. Although the mobile device 100 is shown as connecting to accessories 110, 120, 130 through the docking station 140, the mobile device 100 can connect directly to any accessory device. In addition to utilizing external antennas contained in accessory devices, the mobile device 100 can utilize an antenna contained in cables used to connect the mobile device 100 to an accessory, or to connect two accessories together, such as cable 180 connecting docking station 140 to accessory 110, 120 or 130. Generally, an accessory device is releasably attachable to a mobile device.

Figure 2:
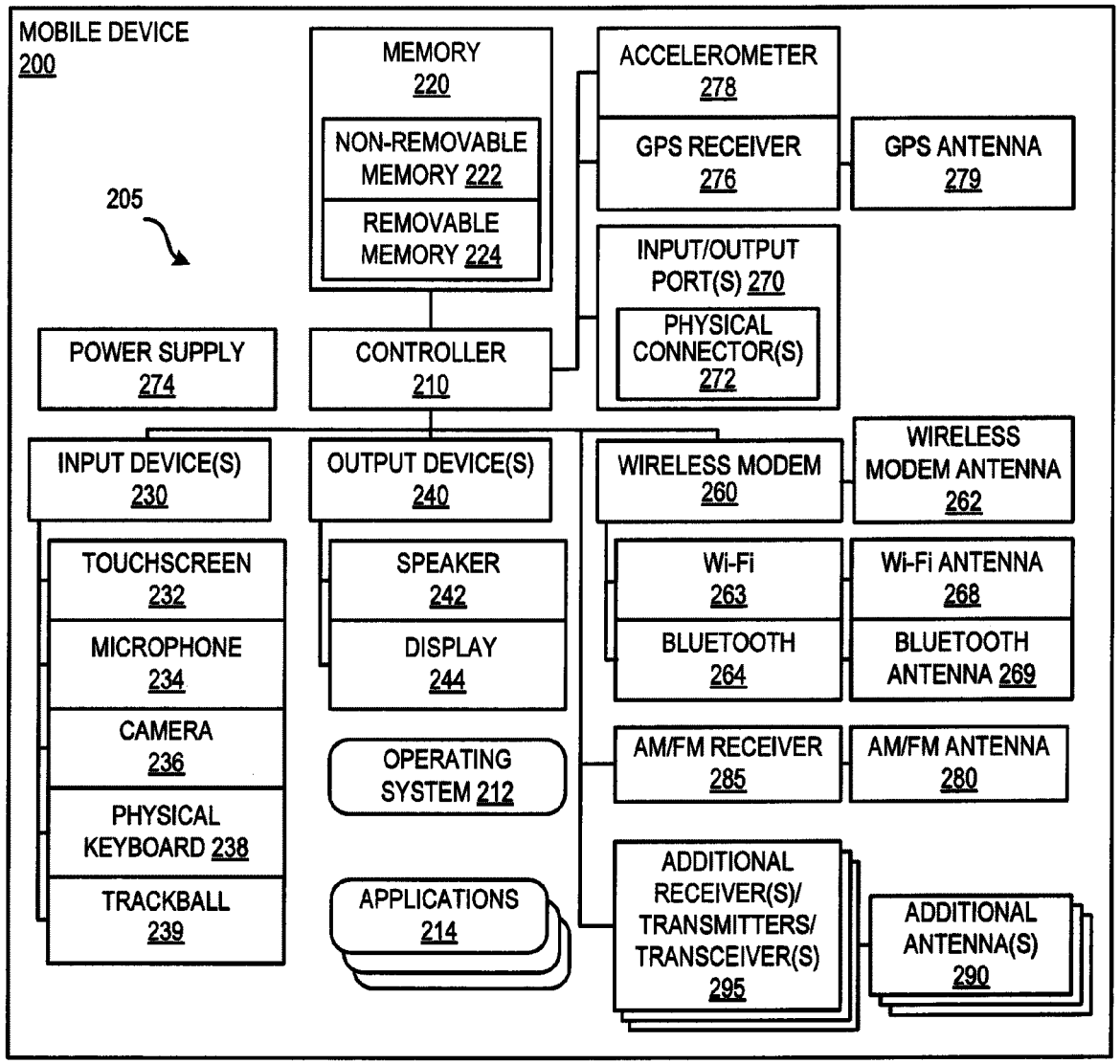
FIG. 2 is a block diagram of an exemplary mobile device.

FIG. 2 is a block diagram of an exemplary mobile device 200 including a variety of optional hardware and software components 205. Any component 205 in the mobile device 200 can communicate with any other component, although not all connections are shown, for ease of illustration.

The illustrated mobile device 200 can include a controller or processor 210 (e.g., signal processor, microprocessor, ASIC, or other control and processing logic circuitry) for performing such tasks as signal coding, data processing, input/output processing, power control, and/or other functions. An operating system 212 can control the allocation and usage of the components 205 and support for one or more application programs 214. The application programs can include common mobile computing applications (e.g., email applications, calendars, contact managers, web browsers, messaging applications), or any other computing application.

The illustrated mobile device 200 can include memory 220. Memory 220 can include non-removable memory 222 and/or removable memory 224. The non-removable memory 222 can include RAM, ROM, flash memory, a hard disk, or other well-known memory storage technologies. The removable memory 224 can include flash memory or a Subscriber Identity Module (SIM) card, which is well known in GSM communication systems, or other well-known memory storage technologies, such as "smart cards." The memory 220 can be used for storing data and/or code for running the operating system 212 and the applications 214. Example data can include web pages, text, images, sound files, video data or other data sets to be sent to and/or received from one or more network servers or other devices by the mobile device 200 via one or more wired or wireless networks. The memory 220 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device 200 can support one or more input devices 230, such as a touch screen 232, microphone 234, camera 236, physical keyboard 238 and/or trackball 239 and one or more output devices 240, such as a speaker 242 and a display 244. Other possible output devices (not shown) can include piezoelectric or other haptic output devices. Some devices can serve more than one input/output function. For example, touchscreen 232 and display 244 can be combined in a single input/output device.

A wireless modem 260 can be coupled to a wireless modem antenna 262 and can support two-way communications between the controller 210 and external devices, as is well understood in the art. The modem 260 and the antenna 262 are shown generically and can be a wireless cellular modem for communicating with a mobile cellular communication network. The wireless modem 260 can comprise other radio-based modems such as a Wi-Fi modem 263 or Bluetooth modem 264, which can each be coupled to an antenna (i.e., Wi-Fi antenna 268, Bluetooth antenna 269). The wireless modem 260 is typically configured for communication with one or more cellular networks, such as a GSM network for data and voice communications within a single cellular network, between cellular networks, or between the mobile device and a public switched telephone network (PSTN).

The mobile device 200 can further include at least one input/output port 270 (which can be a USB port, IEEE 1394 (FireWire) port, and/or RS-232 port) comprising physical connectors 272, a power supply 274, a satellite navigation system receiver such as a GPS receiver 276, and an accelerometer 278. The GPS receiver 276 can be coupled to a GPS antenna 279. The mobile device 200 can additionally include an AM/FM antenna 280 coupled to an AM/FM receiver 285 for receiving radio signals broadcast by an AM/FM radio signal transmitter. The mobile device 200 can further include one or more additional antennas 290 coupled to one or more additional receivers, transmitters and/or transceivers 295 to enable various additional functions. For example, mobile device 200 can include an additional antenna 290 coupled to an additional receiver 295 configured to receive and process a DARS signal for output at the mobile device 200 or an attached accessory.

Although the various antennas are shown as separate hardware components of the mobile device 200, they can be incorporated into other components. For example, GPS antenna 279 can be incorporated into the GPS receiver 276. In addition, antenna shown as separate in FIG. 2 can be implemented as a single antenna. For example, the AM/FM antenna 280 and the GPS antenna 279 can be a single antenna shared by GPS receiver 276 and AM/FM receiver 285. Furthermore, multiple antennas can be connected to a switch to allow a component to be coupled to one of several antenna sources, or to more than one antenna source. For example, the AM/FM receiver 285 can be connected to a switch (not shown) that allows either the AM/FM antenna 280 or an antenna external to the mobile device 200 to be used as the AM/FM receiver antenna source. The switch can also be configured to allow both the AM/FM antenna 280 and an external antenna, or multiple antennas to be simultaneously used as antenna sources for the receiver 285.

The antennas shown in FIG. 2 are internal antennas. That is, they are permanently attached to the mobile device 200 so as to be part of the mobile device 200 itself. The internal antennas can be partially or fully external (although still physically attached) to the mobile device 200 and can be extendable or retractable. For example, an internal antenna can have a portion that is located within a protrusion in an otherwise substantially rectangular mobile device housing. In contrast, an external antenna as described herein is any antenna that is not permanently attached to a mobile device. External antennas include antennas that are part of or attached to a releasably attachable accessory device. Thus, whether or not an antenna is an external antenna or an internal antenna depends on the context in which the antenna is being referred. An antenna that is part of an accessory device is an internal antenna with respect to the accessory device, but is an external antenna with respect to a connected mobile device. Referring back to FIG. 1, antennas included in or attached to the personal computer 110, television 120, stereo system 130 or docking station 140 are external antennas with respect to the mobile device 100.

The illustrated components 205 are not required or all-inclusive, as any components can be deleted and other components can be added.

Figure 3:
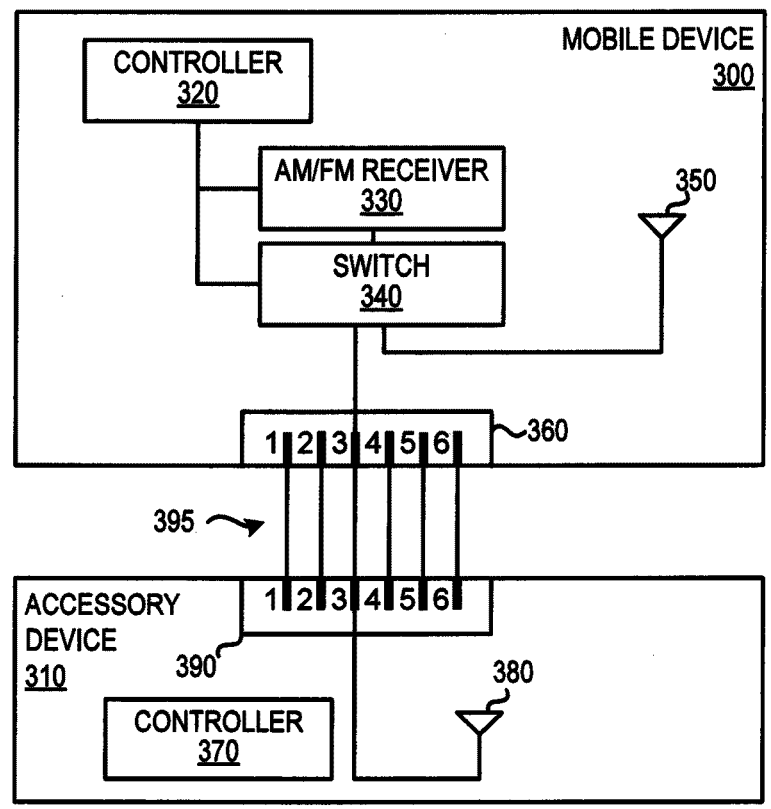
FIG. 3 is a block diagram of an exemplary mobile device connected to an exemplary accessory device supporting an external antenna.

FIG. 3 is a block diagram of an exemplary mobile device 300 releasably attached to an accessory device 310 comprising an external antenna. The mobile device 300 comprises a controller 320, an AM/FM receiver 330, a switch 340, an internal antenna 350 and a physical connector 360. The mobile device 300 and accessory device 310 can further comprise any combination of the components 205 illustrated in FIG. 2, as well as additional components. The accessory device 310 comprises a controller 370, an antenna 380 and a physical connector 390. As antenna 380 of the accessory device is not permanently attached to the mobile device 300, antenna 380 is an external antenna with respect to mobile device 300. The accessory device 310 is attached to the mobile device 300 through connection of the accessory device physical connector 390 to the mobile device physical connector 360, creating a bus 395. Connectors 360 and 390 are illustrated as comprising six pins, although generally, connectors 360 and 390 can comprise any number of pins.

The mobile device controller 320 can be configured to query whether the accessory device 310 supports at least one external antenna, receive indications that the accessory device supports external antennas and automatically select a mobile device pin as an active external pin. An accessory device supports an external antenna if the accessory comprises an antenna, is connected to an antenna, or is connected to another accessory device that supports antenna. The mobile device controller 320 can further be configured to store various mobile device antenna states or configurations. For example, upon selecting external antenna 380 of the accessory device 310, the controller 320 can store an antenna state corresponding to this antenna configuration. The stored configuration can include such information as identifying information of the accessory device 310 (i.e., a unique device identifier), the selected mobile device pin for the current configuration (pin 3, in this example), and additional information about the selected external antenna (i.e., antenna size, tuning information). Antenna configuration information can be stored in mobile device memory such as removable memory 224 or non-removable memory 222 or in computer-readable storage media external to the mobile device 300. The accessory device controller 370 can be configured to receive queries from the mobile device 300 and to send to the mobile device 300 indications of whether the accessory device supports an antenna that can be used by the mobile device 300, along with addition information regarding the supported antenna(s).

The mobile device 300 can be releasably attached or connected to the accessory device 310 in various manners. For example, the mobile device connector 360 can comprise a male connector portion and the accessory device connector 390 can comprise a female connector portion. The male connector portion can comprise pins that fit into sockets of the female connector portion, or the male and female connector portions can be connected by a cable. Alternatively, the male connector portion could be integrated into the accessory device 310 and the female connector portion could be integrated into the mobile device 300. In addition to providing a physical connection, the connector can provide an electrical connection between the mobile and accessory devices 300 and 310 for communication electrically there between. The connectors 360 and 390 can be any known mechanism for providing a physical and electrical connection between devices. In some embodiments, the first and second devices can be physically separated and electronically disconnected by pulling the devices apart. In other embodiments, the devices can be separated and disconnected by sliding the devices relative to each other, and then pulling them apart. In yet other embodiments, the devices can be physically connected by the use of magnets or any releasable mechanical couplers.

Switch 340 allows either internal antenna 350 or an external antenna operatively coupled to one of the pins of the physical connector 360 to be utilized as the antenna source for AM/FM receiver 330 (for purposes of illustration, pin 3 is shown as the pin coupled to the external antenna 380). A pin of a connector is operatively coupled to an antenna if the pin is directly or indirectly connected to the antenna. For example, pin 3 of the accessory connector 390 is operatively coupled to external antenna 380 as it is directly connected to the antenna. Similarly, pin 3 of the mobile device connector is operatively coupled to antenna 380 due to the connection of connector 360 with connector 390. Pin 3 of connectors 360 and 390 would still be operatively coupled to antenna 380 even if connector 390 is coupled to antenna 380 via circuitry disposed between the connector 390 and the antenna 380, such as a switch. External antenna 380 can be selected as an antenna for use by the mobile device 300 as antenna 380 is operatively coupled to pin 3 of the mobile device connector 360, a pin that is configured to operate as an active external pin, through its connection to switch 340. In some configurations the switch 340 can be configured to allow internal antenna 350 and an external antenna to be simultaneously coupled to the AM/FM receiver 330.

Figure 4:
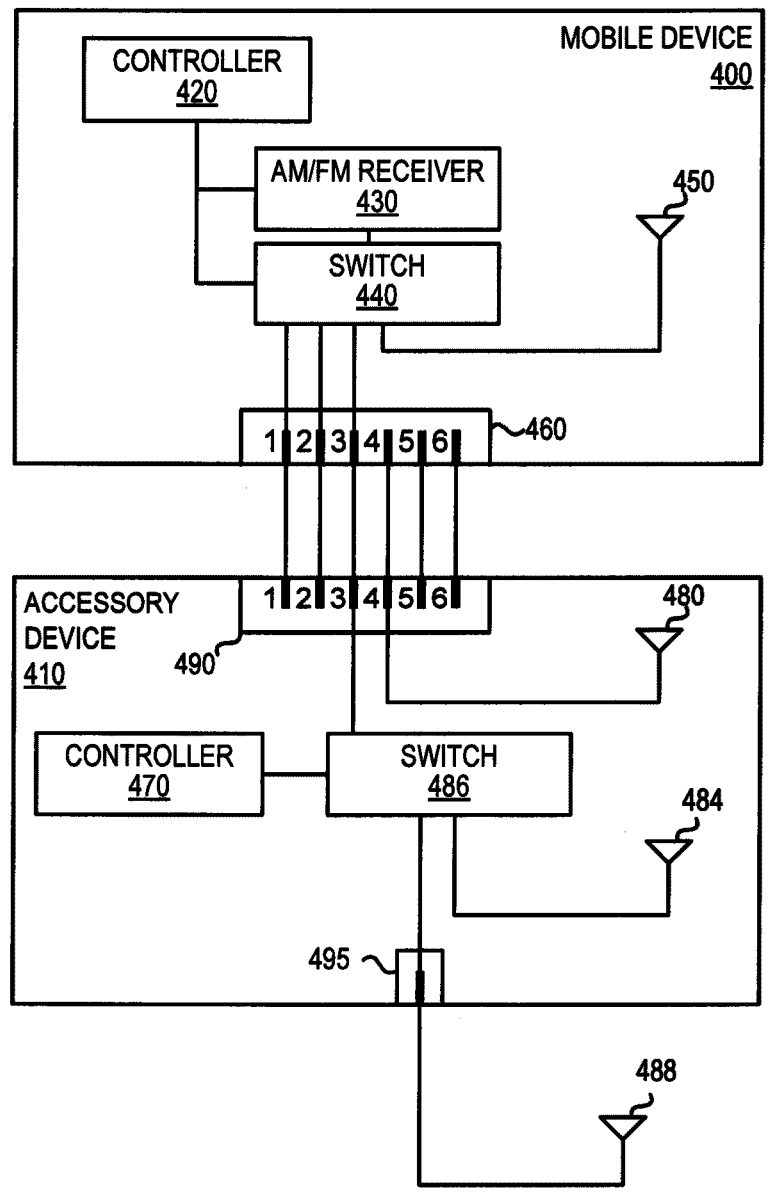
FIG. 4 is a block diagram of an exemplary mobile device connected to an exemplary accessory device supporting multiple external antennas.

FIG. 4 is a block diagram of an exemplary mobile device 400 releasably attached to an accessory device 410 that supports multiple external antennas. The mobile device 400 comprises a controller 420, an AM/FM receiver 430, a switch 440, an internal antenna 450 and a physical connector 460. The mobile device 400 differs from the mobile device 300 in that three pins of the connector 460, pins 1 through 3 are configured to operate as external antenna pins through connection of the pins to switch 440. The accessory device 410 comprises a controller 470, antennas 480, 484, switch 486 and connectors 490, 495. An antenna 488 is connected to the accessory 410 via a connector 495. Antennas 480, 484, 488 are external antennas relative to mobile device 400. However, only antennas 484 and 488 are available for use by mobile device 400 as these antennas are operatively coupled to pin 3 of connector 490, which is connected to a pin of the mobile device connector 460 (pin 3) that is configured to operate as an external antenna source. Antenna 480 is not available for use by the mobile device 400 as antenna 480 is coupled to pin 4 of the accessory connector 490, a pin that is connected to a mobile device connector pin that is not configured to operate as an external antenna pin.

In addition to the functions supported by the accessory device controller 370 discussed above in regards to FIG. 3, the accessory device controller 470 can be further configured to detect whether any antenna, such as antenna 488, is connected to accessory device 410. Controller 470 can be further configured to control switch 486 to connect the accessory connector 490 to external antenna 484 or 488.

Figure 5:
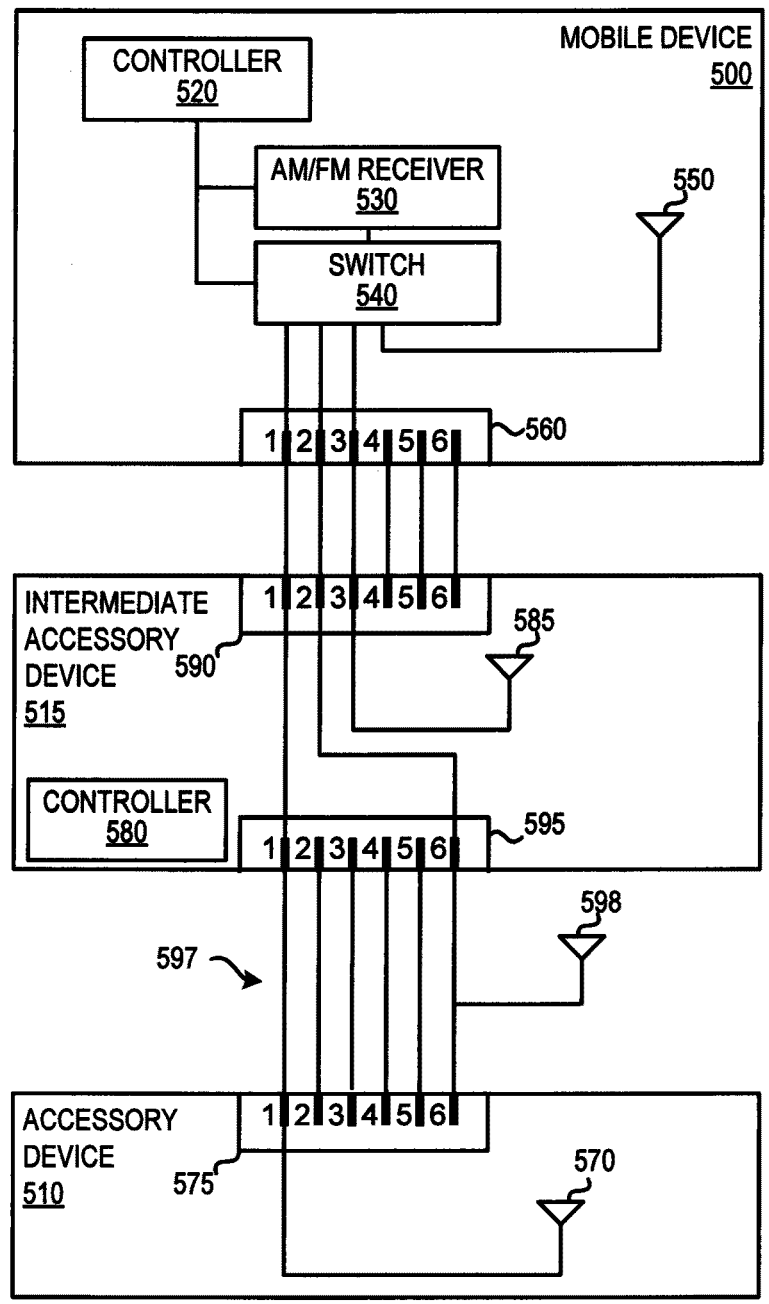
FIG. 5 is a block diagram of an exemplary mobile device coupled to an exemplary accessory device supporting an external antenna via an intermediate accessory device supporting multiple external antennas.

FIG. 5 is a block diagram of an exemplary mobile device 500 coupled to an exemplary accessory device 510 via an intermediate accessory device 515. The mobile device 500 comprises a controller 520, an AM/FM receiver 530, a switch 540, an internal antenna 550 and a connector 560. The accessory device 510 comprises an external antenna 570 and a connector 575. The intermediate accessory device 515 comprises a controller 580, an antenna 585 and connectors 590 and 595. A physical connector 597 connecting accessories 510 and 515 comprises an antenna 598 as part of line or pin 6 of the connector 597.

In addition to the functions supported by the accessory device controller 370 discussed above in regards to FIG. 3, the controller 580 of the intermediate accessory device 515 can be configured to detect antennas supported by accessory device 510 using any of the methods described herein. For example, controller 580 can be configured to query accessory device 510 whether the accessory 510 supports at least one external antenna and to receive an indication that the accessory 510 supports at least one external antenna. In addition, the controller 580 can be configured to determine whether any attached physical connector comprises an antenna, such as antenna 598.

Figure 6:
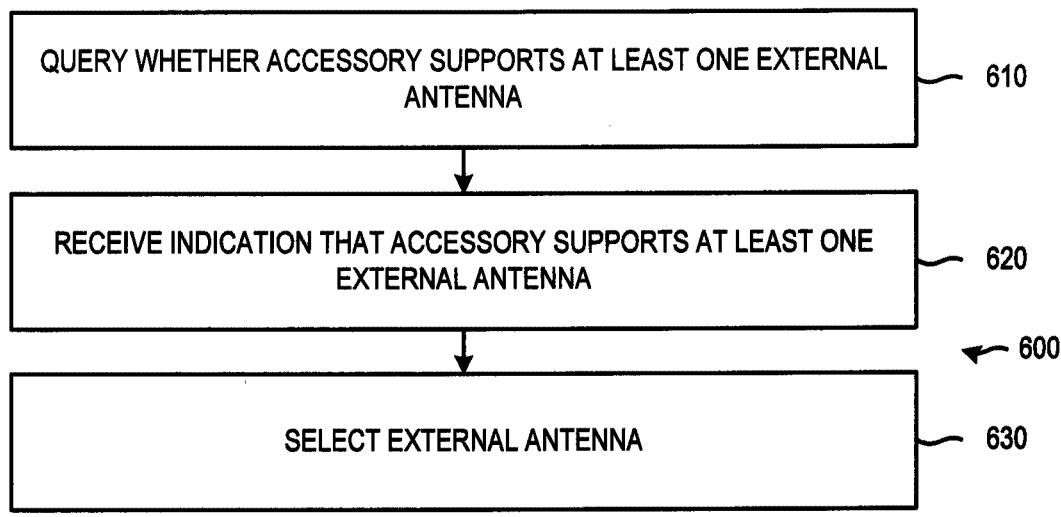
FIG. 6 is a flowchart of a first embodiment of a method of selecting an antenna for use by a mobile device.

FIG. 6 is a flowchart of a first embodiment 600 of a method of selecting an antenna for use by a mobile device. The method 600 can be performed, for example, by a mobile phone configured to receive AM/FM radio signals and connected to a docking station that includes an antenna. At 610, the mobile device queries a releasably attached accessory device whether the accessory device supports at least one external antenna. The mobile device can comprise one or more connector pins. The query can take the form of the mobile device sending a command or request to the accessory device over one or more of pins of a connection between the mobile and accessory devices. The query can be made in response to the mobile device detecting that the accessory device has been connected to the mobile device. The mobile device can also query the accessory device at any time after connection, such as prior to utilizing a mobile device function or capability that utilizes an antenna, such as hosting a mobile phone call. In the example, the mobile phone can query the docking station whether the docking station supports at least one external antenna upon being connected to the docking station or prior to utilizing the AM/FM radio reception capabilities of the mobile phone.

At 620, the mobile device receives an indication that the accessory device supports one or more external antennas. In some embodiments, the indication can comprise a set or cleared bit or flag indicating that a connected accessory device supports at least one external antenna. For example, the docking station can send a message to the mobile phone indicating that the docking station comprises an antenna that can be used by the mobile phone. In other embodiments, the indication can comprise additional information about external antennas supported by the accessory device such as which accessory device pin is operatively coupled to an external antenna, which particular frequencies or frequency bands each external antenna is tuned to, physical characteristics of the antennas (length, material, antenna orientation relative to the mobile accessory device housing), etc.

For example, if a mobile device is connected to an accessory device that comprises, or is connected to multiple external antennas, the indication can comprise a list of accessory pins that are operatively coupled to the external antennas. For example, the docking station could return an indication that pins 3 through 6 of the docking station are operatively coupled to external antennas.

At 630, the mobile device selects one of the external antennas supported by the accessory device as an antenna for use by the mobile device. The selecting can comprise selecting a mobile device pin operatively coupled to the selected external antenna, as an active external antenna pin. In some embodiments, the mobile device can select a default or predetermined pin of the mobile device connector. Selecting a mobile device pin can comprise setting a variable, flag, register, data stored in computer-readable memory or a control signal to a setting or value that indicates the mobile device can use the mobile device pin as an active external antenna pin. The selected mobile device pin is an active external antenna pin in that it is operatively coupled to an external antenna. In the example, the mobile phone can select a default pin of the mobile phone. Accordingly, the external antenna operatively coupled to the default or pre-determined pin would be selected as an external antenna for use by the mobile device.

If the accessory device supports multiple external antennas, the mobile and accessory devices can negotiate which mobile device pin is to be selected as an active external antenna pin. If the mobile device receives an indication that multiple external antennas are supported, selecting the external antenna can comprise selecting a mobile pin that is operatively coupled to an external antenna and that is configured to operate as an external antenna pin. For example, referring back to FIG. 4, the mobile device 400 can receive an indication that the accessory device 410 supports external antennas at accessory pins 3 and 4. Mobile device pins 1 through 3 of the mobile pin connector are configured as external antenna input pins as they are antenna input pins for a component of the mobile device (i.e., antenna switch 440). Accordingly, mobile device 400 can select mobile device pin 3 as an active external antenna pin.

In some embodiments, the mobile device can instruct the accessory device to operatively couple one of the external antennas supported by the accessory device to the selected mobile device pin. For example, if one of multiple external antennas are capable of being connected to an accessory connector via a switch (e.g., antennas 484 and 488 connected to connector 490 via switch 486), the mobile device can instruct the accessory controller to switch to a specified external antenna. The mobile device controller can select the specified external antenna based on criteria such which external antenna has the greater size or which antenna is most closely tuned to a particular frequency or frequency band. Thus, the accessory device can be considered dynamically configurable in that various external antennas can be made available to a mobile device pin. The mobile device can instruct the accessory device to switch to a different external antenna at any time, such as when a mobile device function or capability is about to be utilized that requires an antenna tuned to a different frequency band that the currently selected external antenna.

In the case where multiple device pins are configured to operate as an external antenna pin and are operatively coupled to an external antenna, various algorithms can be used to select a mobile device pin. For example, a mobile device pin can be selected randomly or according to criteria such as which of the external antennas is most closely tuned to a desired frequency or frequency band. In the example of FIG. 5, external antennas 598 and 585 are operatively coupled to mobile devices pins 2 and 3 respectively. The mobile device 500 could choose between pins 2 and 3 by selecting, for example, which pin is operatively coupled to an external antenna that is more closely tuned to receiving AM/FM radio signals for use by AM/FM receiver 530.

In other embodiments, the method 600 can comprise additional or fewer steps. For example, the method 600 can comprise the mobile device using the supported external antenna operatively coupled to the selected mobile device pin, switching from an internal antenna of the mobile device to the selected external antenna, storing the current mobile device antenna configuration or state, and/or deselecting the internal antenna for use by the mobile device. The method 600 can further comprise receiving an indication that the external antenna operatively coupled to the selected mobile device pin is no longer available for use by the mobile device and, in response, selecting the internal antenna for use by the mobile device. The indication that the external antenna operatively coupled to the selected mobile device pin is no longer available for use by the mobile device can be generated, for example, in response to detecting disconnection of the accessory from the mobile device.

In some embodiments, the mobile device can be a mobile phone and the internal antenna can be coupled to a receiver configured for receive-only communication. For example, the mobile device can comprise an antenna tuned to receive AM/FM radio signals coupled to an AM/FM receiver. The mobile device can further comprise a second internal antenna coupled to a transceiver configured for two-way communication with a cellular communication network for hosting a phone call or accessing the Internet. In other embodiments, the mobile device can receive an accessory device identifier upon being connected to an accessory device and retrieve a stored antenna configuration corresponding to the attached accessory device. In this case, the mobile device selects the external antenna based on the retrieved antenna configuration.

The method 600 can also be performed by a mobile device connected to multiple accessory devices. The multiple accessory devices can each be directly connected to the mobile device, or the accessory devices can be connected to the mobile device in a daisy chain configuration such as shown in FIG. 5. The mobile device can send queries to each connected accessory device, receive indications of external antennas supported by each accessory device (including external antennas supported by accessory devices further down a daisy chain), and select one or more mobile device pins operatively coupled to the supported external antennas. The mobile device can select and simultaneously use multiple external antennas across one or more attached accessory devices.

Figure 7:
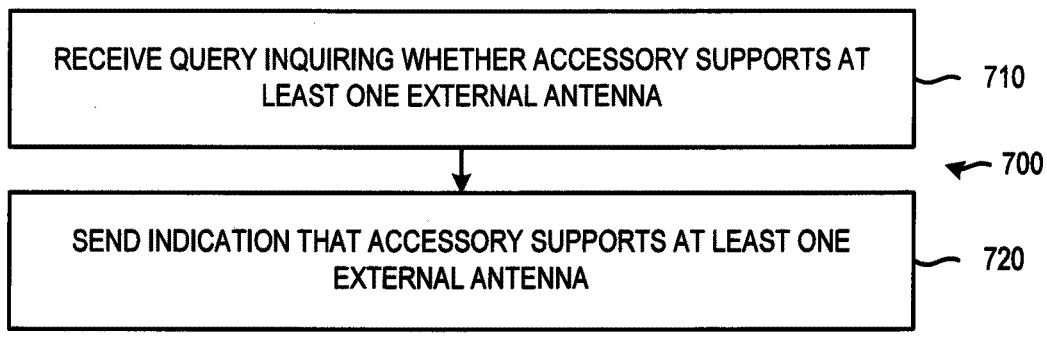
FIG. 7 is a flowchart of a method of providing an antenna for use by a mobile device.

Instead of selecting a mobile device pin at 630, the mobile device can select an accessory pin or a line or pin of the mobile device-accessory device connection that as operatively coupled to the selected external antenna. In these cases, the selected accessory or connector pin can be the active external antenna pin. FIG. 7 is a flowchart of a method of providing an antenna for use by a mobile device. The method 700 can be used, for example, by a mobile phone connected to a docking station. At 710, an accessory device releasably attached to a mobile device receives a query from the mobile device inquiring whether the accessory device supports at least one external antenna. For example, the docking station can receive a query from the mobile phone whether the docking station supports one or more external antennas.

At 720, an indication that the accessory device supports one or more antennas is sent. In some embodiments, the indication can comprise a set or cleared bit or flag indicating that the accessory device supports one or more external antennas. In other embodiments, the indication can comprise additional information about the supported external antennas such as which accessory device pins are operatively coupled to which supported accessory device antennas, which frequencies or frequency bands each external antenna is tuned to and the like. In the example, the docking station can send a message to the mobile device that the docking station comprises an antenna on, for example, pin 3.

Figure 8:
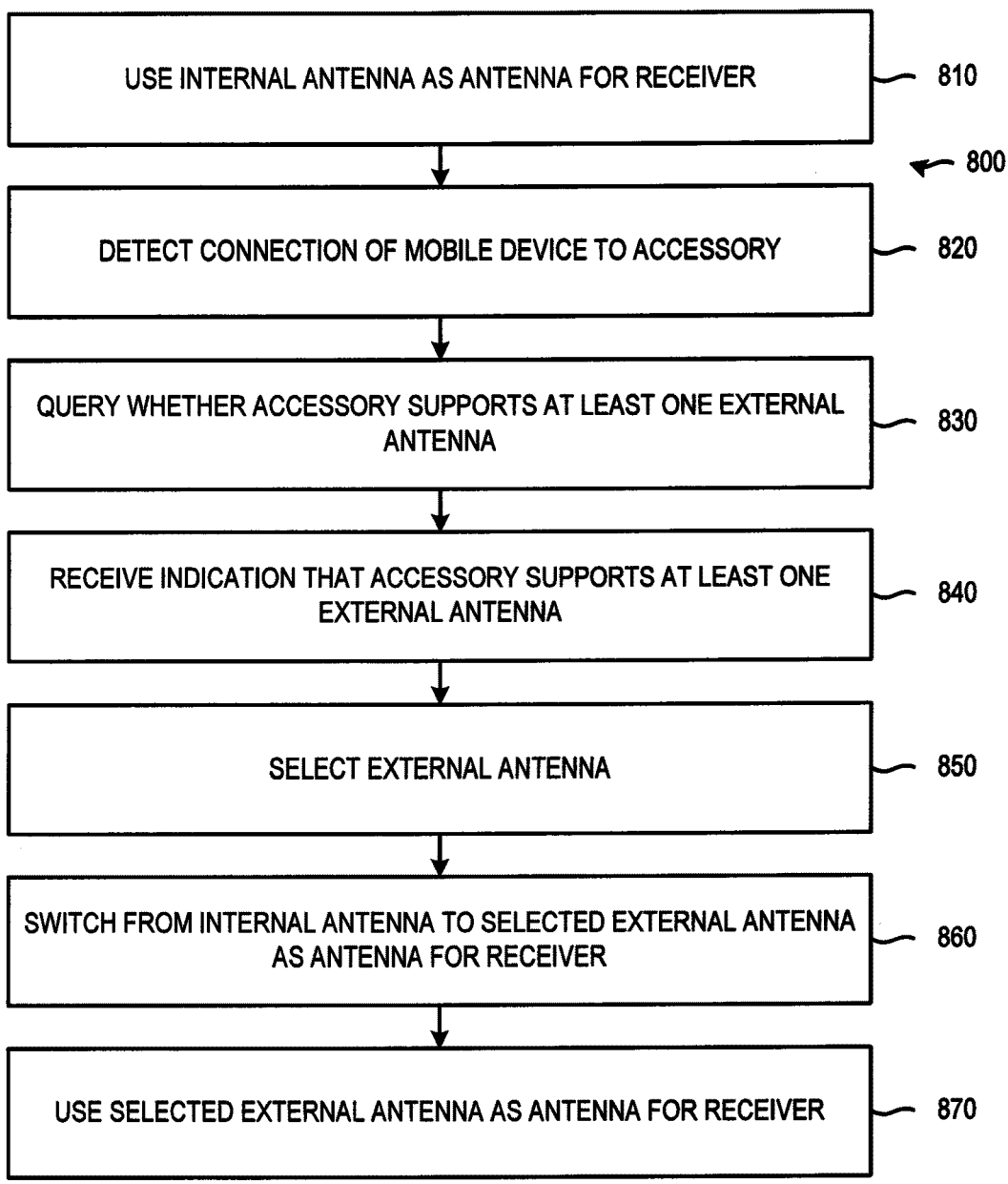
FIG. 8 is a flowchart of a method of selecting an antenna for use by an AM/FM receiver of a mobile device.

FIG. 8 is a flowchart of a method 800 of selecting an antenna for use by a receiver configured for receive-only communication. The method 800 can be performed by a mobile phone comprising an internal antenna coupled to an AM/FM receiver. At 810, a mobile device internal antenna is used as the antenna source for the receiver. At 820, connection of the mobile device to an accessory device is detected. In the example, the mobile phone can detect connection to the docking station. At 830, the mobile device queries the accessory device as to whether the accessory device supports at least one external antenna. For example, the mobile phone can query the docking station whether the docking station supports external antennas. At 840, the mobile device receives an indication that the accessory device supports at least one antenna. The mobile phone can receive an indication from the docking station that the docking station comprises an antenna. At 850, the mobile device selects a mobile device pin operatively coupled to one of the external antennas supported by the accessory device. In the example, the mobile phone can select a pin operatively coupled to an external antenna that is part of the docking station. At 860, the mobile device switches from the internal antenna to the external antenna operatively coupled to the selected mobile device pin. For example, the mobile phone can switch from the internal antenna to the docking station antenna as the antenna source for the mobile device AM/FM receiver. At 870, the supported external antenna is used as the antenna for the receiver. In the example, the mobile device AM/FM receiver uses the docking station antenna.

Figure 9:
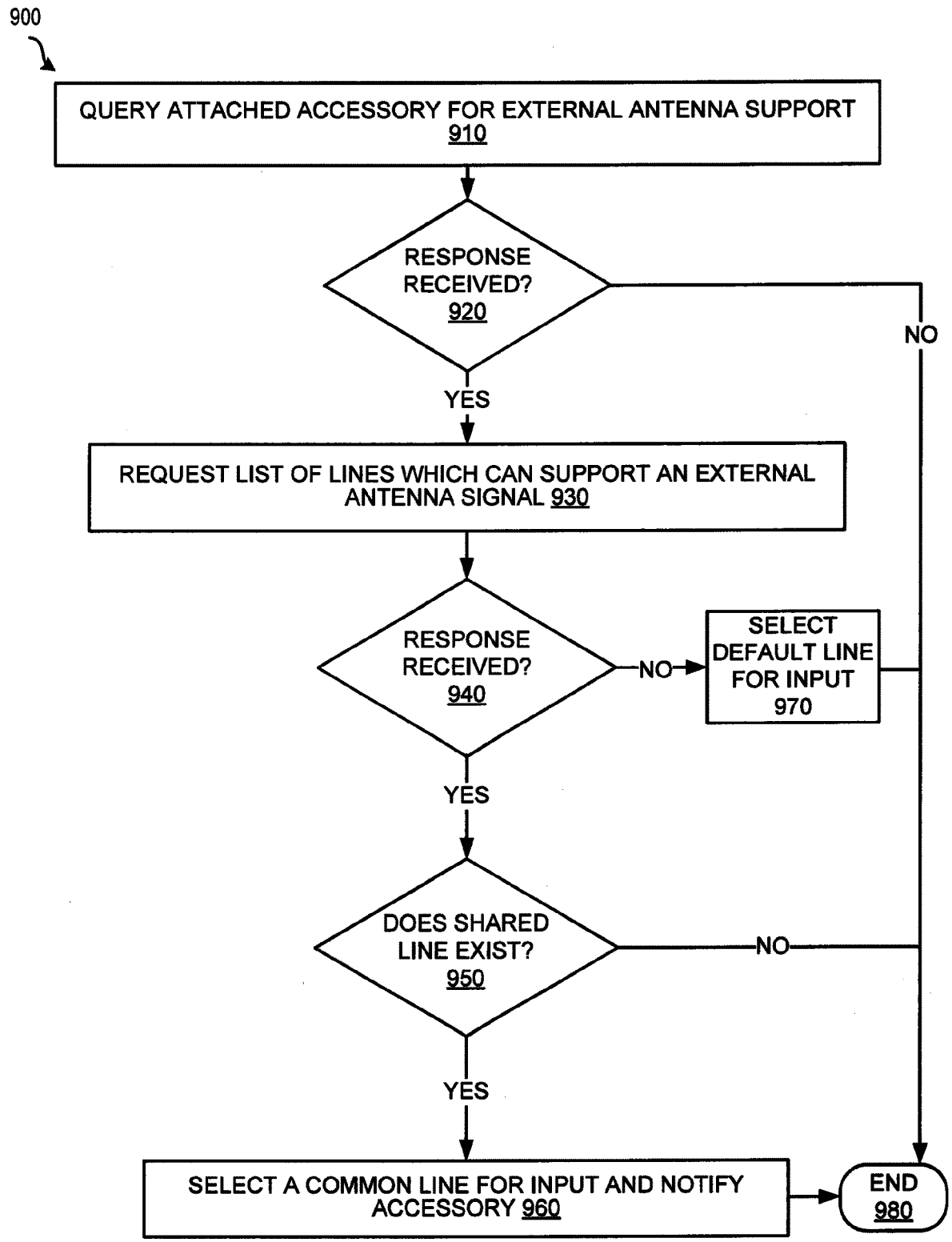
FIG. 9 is a flowchart of a second embodiment of a method of selecting an antenna for use by a mobile device.

FIG. 9 is a flowchart of a second embodiment 900 of a method of selecting an antenna for use by a mobile device. The method 900 can be performed, for example, by a smart phone connected to an accessory stereo system comprising or connected to multiple antennas. At 910, the mobile device queries an accessory device for external antenna support. For example, the smart phone can query the attached stereo system whether the stereo system provides external antenna support. At 920, the mobile device determines whether a response has been received from the accessory device. In the example, the smart phone can wait a predetermined length of time for a response from the stereo system before determining that the stereo system has not responded. If no response has been received, the method 900 ends at 980, and it is assumed no external antenna is available.

At 930, the mobile device requests a list of which lines or pins of the accessory device connection can support an external antenna signal. At 940, the mobile device receives a response from the accessory. In the example, the smart phone can request a list of which stereo system pins support an external antenna signal and, in response, receives a response from the accessory indicating that, for example, pins 1 and 2 of the speaker system connector support an external antenna signal. At 970, if no response is received the mobile device selects a default line or pin of the mobile device-accessory device connection as the external antenna signal input. At 950, if a response is received, the mobile device determines whether a shared line or pin of the connection exists. A shared line or pin is one that is connected to a mobile device pin configured to operate an external antenna input and to an accessory device pin that is operatively coupled to an external antenna. If there is no shared line or pin, method 900 ends. In the example, the smart phone determines whether pin 1 or 2 of the mobile device is configured to operate as an external antenna pin, and thus, whether line 1 or 2 of the mobile device-accessory device includes shared lines.

At 960, if a shared line exists, the mobile device selects a shared line for input and notifies the accessory device. For example, if pin 1 of the smart phone is configured to support an external antenna signal, the smart phone selects pin 1 of the smart phone-speaker system interface as an external antenna input and notifies the speaker system. In response to the notification, the accessory device can route a supported external antenna to the selected pin, if needed. For example, if the selected shared line corresponds to a dynamically configurable accessory device pin that is presently unconfigured (i.e., the accessory device pin is not coupled to a supported external antenna), the accessory can route a supported external antenna to the configurable accessory device pin.

The method 900 can comprise additional operations or be otherwise modified. For example, in response to the query sent to the accessory device at 910, the accessory can send a response to the mobile device indicating that the accessory does not provide support for external antennas. In another variation, the accessory device can send an indication to the mobile device that there has been a change in its external antennas capabilities (i.e., an antenna or another accessory comprising an antenna has been attached to or removed from the accessory). The query at 910 can be sent in response to this indication. At the end 980 of the method 900, the mobile device can switch to or continue to use an internal antenna of the mobile device.

Figure 10:
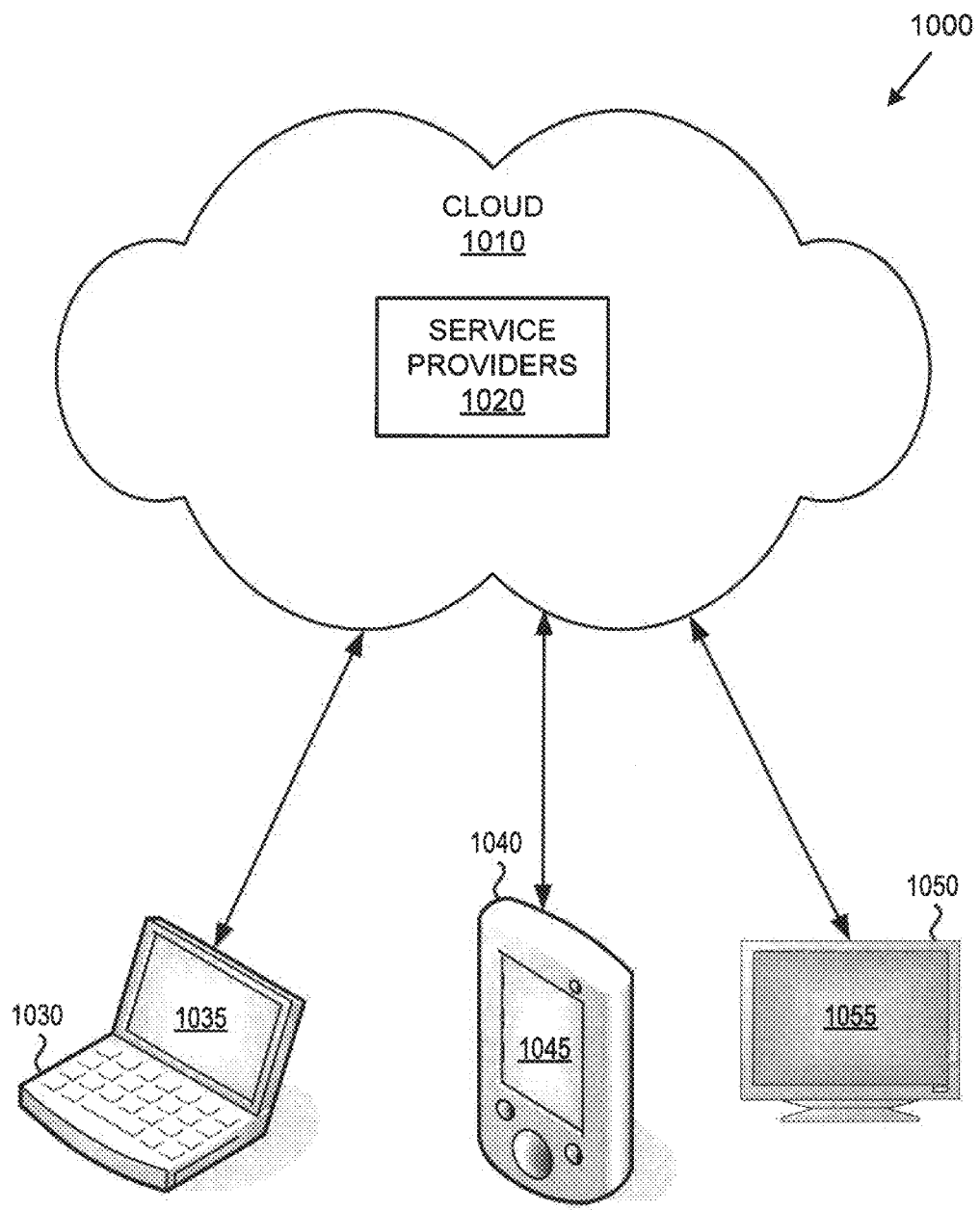
FIG. 10 is a block diagram of an exemplary cloud computing environment for a mobile device.

FIG. 10 illustrates a generalized example of a suitable implementation environment 1000 in which described embodiments, techniques, and technologies can be implemented.

In example environment 1000, various types of services (e.g., computing services) are provided by a cloud 1010. For example, the cloud 1010 can comprise a collection of computing devices, which can be located centrally or distributed, that provide cloud-based services to various types of users and devices connected via a network such as the Internet. The implementation environment 1000 can be used in different ways to accomplish computing tasks. For example, some tasks (e.g., processing user input and presenting a user interface) can be performed on local computing devices (e.g., connected devices 1030, 1040, 1050) while other tasks (e.g., storage of data to be used in subsequent processing) can be performed in the cloud 1010.

In example environment 1000, the cloud 1010 provides services for connected devices 1030, 1040, 1050 with a variety of screen capabilities. Connected device 1030 represents a device with a computer screen 1035 (e.g., a mid-size screen). For example, connected device 1030 could be a personal computer such as desktop computer, laptop, notebook, netbook or the like. Connected device 1040 represents a device with a mobile device screen 1045 (e.g., a small size screen). For example, connected device 1040 could be a mobile phone, smart phone, personal digital assistant, tablet computer and the like. Connected device 1050 represents a device with a large screen 1055. For example, connected device 1050 could be a television screen (e.g., a smart television) or another device connected to a television (e.g., a set-top box or gaming console) or the like. One or more of the connected devices 1030, 1040, 1050 can include touch screen capabilities. Devices without screen capabilities also can be used in example environment 1000. For example, the cloud 1010 can provide services for one or more computers (e.g., server computers) without displays.

Services can be provided by the cloud 1010 through service providers 1020, or through other providers of online services (not depicted). For example, cloud services can be customized to the screen size, display capability, and/or touch screen capability of a particular connected device (e.g., connected devices 1030, 1040, 1050).

In example environment 1000, the cloud 1010 provides the technologies and solutions described herein to the various connected devices 1030, 1040, 1050 using, at least in part, the service providers 1020. For example, the service providers 1020 can provide a centralized solution for various cloud-based services. The service providers 1020 can manage service subscriptions for users and/or devices (e.g., for the connected devices 1030, 1040, 1050 and/or their respective users).

Any of the disclosed methods can be implemented as computer-executable instructions stored on one or more computer-readable storage media (e.g., non-transitory computer-readable media, such as one or more optical media discs, volatile memory components (such as DRAM or SRAM), or nonvolatile memory components (such as hard drives)) and executed on a computer (e.g., any commercially available computer, including smart phones or other mobile devices that include computing hardware). Any of the computer-executable instructions for implementing the disclosed techniques as well as any data created and used during implementation of the disclosed embodiments can be stored on one or more computer-readable media (e.g., non-transitory computer-readable media). The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network)) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

Additional embodiments and aspects of the technologies described herein are described in the following numbered embodiments.

Embodiment 1. A method of selecting an antenna (350, 380, 450, 480, 484, 488, 550, 570, 585, 598) for use by a mobile device (300, 400, 500), the method comprising: at the mobile device (300, 400, 500), querying an accessory device (310, 410, 510, 515) releasably attached to the mobile device (300, 400, 500) whether the accessory device (310, 410, 510, 515) supports at least one external antenna (380, 480, 484, 488, 570, 585, 598), wherein the accessory device (310, 410, 510, 515) supports one or more external antennas (380, 480, 484, 488, 570, 585, 598); receiving an indication that the accessory device (310, 410, 510, 515) supports at least one external antennas (380, 480, 484, 488, 570, 585, 598); and selecting one of the one or more external antennas (380, 480, 484, 488, 570, 585, 598) supported by the accessory device (310, 410, 510, 515) as an antenna for use by the mobile device (300, 400, 500).

Embodiment 2. The method of any of the previous numbered embodiments, wherein the mobile device (300, 400, 500) comprises a mobile device pin operatively coupled to the one of the one or more external antennas (380, 480, 484, 488, 570, 585, 598) and the selecting one of the one or more external antennas (380, 480, 484, 488, 570, 585, 598) comprises selecting the mobile device pin as an active external antenna pin.

Embodiment 3. The method of any of the previous numbered embodiments, wherein the accessory device (310, 410, 510, 515) comprises a pin connected to the selected mobile device pin, the method further comprising instructing the accessory device (310, 410, 510, 515) to operatively couple the selected external antenna (380, 480, 484, 488, 570, 585, 598) to the accessory device pin.

Embodiment 4. The method of any of the previous numbered embodiments, wherein the selected mobile device pin is a predetermined mobile device pin.

Embodiment 5. The method of any of the previous numbered embodiment, wherein the accessory device (310, 410, 510, 515) comprises one or more pins and the indication indicates which of the one or more accessory device pins are operatively coupled to the one or more external antennas (380, 480, 484, 488, 570, 585, 598) supported by the accessory device (310, 410, 510, 515).

Embodiment 6. The method of any of the previous numbered embodiments, wherein the selected mobile device pin is configured to operate as an external antenna input pin and is connected to one of the one or more accessory device pins indicated as being operatively coupled to the one or more external antennas (380, 480, 484, 488, 570, 585, 598).

Embodiment 7. The method of any of the previous numbered embodiments, further comprising detecting connection of the accessory device (310, 410, 510, 515) to the mobile device (300, 400, 500), wherein the querying is performed in response to detecting the connection.

Embodiment 8. The method of any of the previous numbered embodiments, the mobile device (300, 400, 500) comprising a first internal antenna (279, 280, 350, 450, 550) and a receiver (276, 285, 330, 430, 530) configured for receive-only communication, wherein the mobile device (300, 400, 500) is a mobile phone and the receiver (276, 285, 330, 430, 530) is coupled to the first internal antenna (276, 285, 330, 430, 530); the method further comprising: using the first internal antenna (279, 280, 350, 450, 550) as an antenna for the receiver (276, 285, 330, 430, 530); detecting connection of the mobile device (300, 400, 500) to the accessory device (310, 410, 510, 515); switching from the first internal antenna (279, 280, 350, 450, 550) to the selected external antenna (380, 480, 484, 488, 570, 585, 598) as the antenna for the receiver (276, 285, 330, 430, 530); and using the selected external antenna (380, 480, 484, 488, 570, 585, 598) as the antenna for the receiver (276, 285, 330, 430, 530).

Embodiment 9. The method of any of the previous numbered embodiments, wherein the receiver is an AM/FM receiver (285, 330, 430, 530).

Embodiment 10. A method of providing an antenna (380, 480, 484, 488, 570, 585, 598) for use by a mobile device (300, 400, 500), the method comprising: at an accessory device (310, 410, 510, 515) releasably attached to the mobile device (300, 400, 500), receiving a query from the mobile device (300, 400, 500) inquiring whether the accessory device (310, 410, 510, 515) supports at least one external antenna (380, 480, 484, 488, 570, 585, 598); and sending an indication that the accessory device (310, 410, 510, 515) supports at least one external antenna (380, 480, 484, 488, 570, 585, 598).

Embodiment 11. The method of any of the previous numbered embodiments, wherein the accessory device (310, 410, 510, 515) comprises one or more accessory device pins and supports one or more external antennas (380, 480, 484, 488, 570, 585, 598), the indication indicating which of the one or more accessory device pins are operatively coupled to the one or more external antennas (380, 480, 484, 488, 570, 585, 598) supported by the accessory device (310, 410, 510, 515).

Embodiment 12. A mobile device (300, 400, 500), comprising: a controller (210, 320, 420, 520); one or more computer-readable storage media (220, 222, 224) storing computer-executable instructions for causing the mobile device (300, 400, 500) to perform a method, the method comprising: at the mobile device (300, 400, 500), querying an accessory device (310, 410, 510, 515) releasably attached to the mobile device (300, 400, 500) whether the accessory device (310, 410, 510, 515) supports at least one external antenna (380, 480, 484, 488, 570, 585, 598), wherein the accessory device (310, 410, 510, 515) supports one or more external antennas (380, 480, 484, 488, 570, 585, 598); receiving an indication that the accessory device (310, 410, 510, 515) supports at least one external antenna (380, 480, 484, 488, 570, 585, 598); and selecting one of the one or more external antennas (380, 480, 484, 488, 570, 585, 598) supported by the accessory device (310, 410, 510, 515) as an antenna (380, 480, 484, 488, 570, 585, 598) for use by the mobile device (300, 400, 500).

Embodiment 13. The mobile device (300, 400, 500) of any of the previous numbered embodiments, wherein the mobile device (300, 400, 500) comprises a mobile device pin operatively coupled to the one or more one of the one or more external antennas (380, 480, 484, 488, 570, 585, 598), the selecting one of the one or more external antennas (380, 480, 484, 488, 570, 585, 598) comprises selecting the mobile device pin, and the selected mobile device pin is a predetermined mobile device pin.

Embodiment 14. The mobile device (300, 400, 500) of any of the previous numbered embodiments, wherein the mobile device (300, 400, 500) comprises a mobile device pin operatively coupled to the one or more one of the one or more external antennas (380, 480, 484, 488, 570, 585, 598), the selecting one of the one or more external antennas (380, 480, 484, 488, 570, 585, 598) comprises selecting the mobile device pin, the accessory device (310, 410, 510, 515) comprises one or more pins, the indication indicates which of the one or more accessory device pins are operatively coupled to the one or more external antennas (380, 480, 484, 488, 570, 585, 598) supported by the accessory device (310, 410, 510, 515), and the selected mobile device pin is configured to operate as an external antenna input pin and is connected to one of the one or more accessory device pins indicated as being operatively coupled to one or more external antennas (380, 480, 484, 488, 570, 585, 598).

Embodiment 15. The mobile device (300, 400, 500) of any of the previous numbered embodiments, wherein the mobile device (300, 400, 500) further comprises a first internal antenna (279, 280, 350, 450, 550), a receiver (276, 285, 330, 430, 530) configured for receive-only communication, a second internal antenna (262, 268, 269, 290) and a transceiver configured for two-way communication (260, 263, 264, 295) with a cellular communication network, the receiver (276, 285, 330, 430, 530) being coupled to the first internal antenna (279, 280, 350, 450, 550), the transceiver (260, 263, 264, 295) being coupled to the second internal antenna (262, 268, 269, 290); the method further comprising: using the first internal antenna (279, 280, 350, 450, 550) as an antenna for the receiver (276, 285, 330, 430, 530); detecting connection of the mobile device (300, 400, 500) to the accessory device (310, 410, 510, 515); switching from the first internal antenna (279, 280, 350, 450, 550) to the selected external antenna (380, 480, 484, 488, 570, 585, 598) as the antenna for the receiver (276, 285, 330, 430, 530); and using the selected external antenna (380, 480, 484, 488, 570, 585, 598) operatively as the antenna for the receiver (276, 285, 330, 430, 530).

The disclosed methods, apparatus and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

We claim:

1. A method of selecting an antenna for use by a mobile device, the method comprising:
   at the mobile device, querying an accessory device releasably attached to the mobile device whether the accessory device supports at least one external antenna, wherein the accessory device supports one or more external antennas;
   receiving an indication that the accessory device supports at least one external antenna, wherein the accessory device comprises one or more pins and the indication indicates which of the one or more accessory device pins are operatively coupled to the one or more external antennas supported by the accessory device; and
   selecting one of the one or more external antennas supported by the accessory device as an antenna for use by the mobile device.

2. The method of claim 1, wherein the mobile device comprises an internal antenna, the method further comprising the mobile device using both the selected external antenna and the internal antenna.

3. The method of claim 1, wherein the mobile device comprises a mobile device pin operatively coupled to the one of the one or more external antennas and the selecting one of the one or more external antennas comprises selecting the mobile device pin as an active external antenna pin.

4. The method of claim 3, wherein the accessory device comprises a pin connected to the selected mobile device pin, the method further comprising instructing the accessory device to operatively couple the selected external antenna to the accessory device pin.

5. The method of claim 3, wherein the selected mobile device pin is a predetermined mobile device pin.

6. The method of claim 1, wherein the selected mobile device pin is configured to operate as an external antenna input pin and is connected to one of the one or more accessory device pins indicated as being operatively coupled to the one or more external antennas.

7. The method of claim 1, further comprising detecting connection of the accessory device to the mobile device, wherein the querying is performed in response to detecting the connection.

8. The method of claim 1, the mobile device further comprising an internal antenna, the method further comprising in response to receiving the indication that the accessory device supports at least one external antenna, deselecting the internal antenna for use by the mobile device when switching to the selected external antenna.

9. The method of claim 8, further comprising:
   detecting disconnection of the accessory device from the mobile device; and
   selecting the internal antenna for use by the mobile device.

10. The method of claim 1, the mobile device comprising a first internal antenna and a receiver configured for receive-only communication, wherein the mobile device is a mobile phone and the receiver is coupled to the first internal antenna; the method further comprising:
    using the first internal antenna as an antenna for the receiver;
    detecting connection of the mobile device to the accessory device;
    switching from the first internal antenna to the selected external antenna as the antenna for the receiver; and
    using the selected external antenna as the antenna for the receiver.

11. The method of claim 10, wherein the receiver is an AM/FM receiver.

12. The method of claim 10, wherein the mobile device further comprises a second internal antenna and a transceiver configured for two-way communication with a cellular communication network, the second internal antenna being coupled to the transceiver.

13. A method of providing an antenna for use by a mobile device, the method comprising:
    at an accessory device releasably attached to the mobile device, receiving a query from the mobile device inquiring whether the accessory device supports at least one external antenna; and
    sending an indication that the accessory device supports at least one external antenna;
    wherein the accessory device comprises one or more accessory device pins, the indication indicating which of the one or more accessory device pins are operatively coupled to the at least one external antenna.

14. A mobile device, comprising: a controller; one or more computer-readable nonvolatile storage media storing computer-executable instructions for causing the mobile device to: query an accessory device releasably attached to the mobile device whether the accessory device supports at least one external antenna, wherein the accessory device supports one or more external antennas coupled to one or more pins on the accessory device; receive an indication that the accessory device supports at least one external antenna, the indication indicates which of the one or more accessory device pins are operatively coupled to the one or more external antennas; and select one of the one or more external antennas supported by the accessory device as an antenna for use by the mobile device.

15. The mobile device of claim 14, wherein the mobile device comprises a mobile device pin operatively coupled to the one or more one of the one or more external antennas, the selecting one of the one or more external antennas comprises selecting the mobile device pin, and the selected mobile device pin is a predetermined mobile device pin.

16. The mobile device of claim 14, wherein the mobile device comprises a mobile device pin operatively coupled to the one or more one of the one or more external antennas, the selecting one of the one or more external antennas comprises selecting the mobile device pin, and the selected mobile device pin is configured to operate as an external antenna input pin and is connected to one of the one or more accessory device pins indicated as being operatively coupled to one or more external antennas.

17. The mobile device of claim 14, the mobile device further comprising an internal antenna, and wherein the computer-executable instructions further cause the mobile device to: deselect the internal antenna for use by the mobile device in response to receiving the indication that the accessory device supports at least one external antenna; detect disconnection of the accessory device from the mobile device; and select the internal antenna for use by the mobile device.

18. The mobile device of claim 14, wherein the mobile device further comprises a first internal antenna, a receiver configured for receive-only communication, a second internal antenna and a transceiver configured for two-way communication with a cellular communication network, the receiver being coupled to the first internal antenna, the transceiver being coupled to the second internal antenna; wherein the computer-executable instructions further cause the mobile device to: use the first internal antenna as an antenna for the receiver; detect connection of the mobile device to the accessory device; switch from the first internal antenna to the selected external antenna as the antenna for the receiver; and use the selected external antenna operatively as the antenna for the receiver.

* * * * *